(12) United States Patent
Armer (10) Patent No.: US 7,856,952 B2
(45) Date of Patent: Dec. 28, 2010

(54) VARIABLE COMPRESSION ENGINE WITH VARIABLE INLET VALVE TIMING

(76) Inventor: Rollin A. Armer, 139 Glorietta Blvd., Orinda, CA (US) 94563

( * ) Notice: Subject to any disclaimer, the term of this patent is extended or adjusted under 35 U.S.C. 154(b) by 154 days.

(21) Appl. No.: 12/287,950

(22) Filed: Oct. 14, 2008

(65) Prior Publication Data
US 2009/0114194 A1 May 7, 2009

Related U.S. Application Data

(60) Provisional application No. 61/002,212, filed on Nov. 6, 2007.

(51) Int. Cl.
*F02B 75/04* (2006.01)
*F01L 1/34* (2006.01)
(52) U.S. Cl. .................. 123/48 A; 123/78 A; 123/90.15
(58) Field of Classification Search ............... 123/48 A, 123/48 AA, 78 A, 78 AA, 90.15–90.18
See application file for complete search history.

(56) References Cited

U.S. PATENT DOCUMENTS

| | | | | |
|---|---|---|---|---|
| 6,055,948 A | * | 5/2000 | Shiraishi et al. | 123/90.15 |
| 6,672,270 B2 | * | 1/2004 | Armer | 123/188.4 |
| 6,691,655 B2 | * | 2/2004 | Aoyama et al. | 123/48 R |
| 7,481,199 B2 | * | 1/2009 | Nakamura | 123/48 R |
| 7,506,620 B2 | * | 3/2009 | Yasui | 123/48 R |

* cited by examiner

*Primary Examiner*—Noah Kamen
(74) *Attorney, Agent, or Firm*—Howard Cohen (57) ABSTRACT

An apparatus for providing two features that improve fuel economy of four stroke internal combustion engines. The first is the provision of a compression ratio which is higher than normal when the engine is operating at light load; and which varies from very high at idling, down to normal at full power. This is effected by a movable piston associated with the inlet valve and connected to the throttle. The second is the provision of variable timing as well as a variable amount of opening of the inlet valve, such that at idle, the valve opens at top center of the main piston, opens only a fraction of its full lift, and closes about 70° crankshaft past top center. As the throttle is opened, the inlet valve opens farther at each open excursion to create as little flow resistance as possible to the inlet draw. At the middle of its open excursion during each valve actuation it moves in the same direction as the crankshaft enough that as the open duration becomes greater, the valve always begins to open as the main piston starts its inlet stroke, but closes later. Finally, at full power, the inlet valve begins to open slightly before the main piston comes to top center, opens fully, and closes somewhat after the main piston has reached bottom center and has started the compression stroke.

17 Claims, 6 Drawing Sheets

VARIABLE COMPRESSION ENGINE WITH VARIABLE INLET VALVE TIMING

CROSS-REFERENCE TO RELATED APPLICATIONS

This application claims the filing date priority of Provisional Patent Application No. 61/002,212, filed Nov. 6, 2007.

FEDERALLY SPONSORED RESEARCH

Not applicable.

SEQUENCE LISTING, ETC ON CD

Not applicable.

BACKGROUND OF THE INVENTION

1. Field of the Invention

This invention relates to internal combustion engines which have one or more power pistons that reciprocate in one or more cylinders. In particular, the invention relates to engines of this type that operate on a four-stroke cycle in which the power pistons cyclically undergo fuel inlet strokes, compression strokes, expansion strokes and exhaust strokes. More particularly, the invention relates to inlet valves and valve operating components which admit a fuel and air mixture into the cylinders of engines of this type. This invention may be considered an improvement over my prior U.S. Pat. No. 6,672,270, issued Jan. 6, 2004, which is incorporated herein by reference in its entirety.

2. Description of Related Art

Fuel efficiency may be defined as pounds of fuel consumed per horsepower hour of work delivered. The fuel efficiency of most engines of the above identified type varies greatly as a function of power output or engine speed. Efficiency is highest when the engine is operating at or near its full power output and at a steady speed. Efficiency decreases when the engine is operated at reduced power outputs. Many uses of such engines require that power output be reduced much of the time. This is most notably the case with automobile engines. Automobile engines are designed to provide for occasional periods of high power output. This is needed, for example, to accelerate the vehicle on freeway on-ramps or while passing other vehicles or to maintain speed on an upgrade. Power output is reduced when the vehicle is cruising at a steady speed on a freeway or highway or is slowed by traffic conditions. Power output ceases when the vehicle is temporarily stopped with the engine idling.

The practical result of these factors is that most conventional automobile engines operate with reduced fuel efficiency much of the time. This increases operating cost, unproductively consumes fuel resources and has adverse effects on efforts to reduce emission of pollutants into the environment.

This problem arises in part as the typical automobile engine is designed to have a low compression ratio that provides for optimum performance when the engine operates at or near full power output. A higher compression ratio would provide greater efficiency during the periods when the engine is being operated at reduced power output but, in the conventional engine, the high ratio causes overly rapid fuel burning resulting in detonation or "knocking" at times when the engine must be operated at or near maximum power output. Fuel detonation severely strains engine components, creates unacceptable noise and drastically reduces engine efficiency.

It has heretofore been recognized that more efficient overall operation can be realized by designing the engine to have a compression ratio which varies as a function of engine load. Compression ratio can be high when the load is light as detonation is not a problem under that condition. In engines which operate on the Atkinson cycle, a mechanism is provided which varies the length of travel of the power pistons in the cylinders so that the inlet stroke is much shorter than the power or expansion stroke. Some prior engines have auxiliary pistons which reciprocate in chambers that are communicated with the power piston cylinders. Auxiliary piston movement varies the compression ratio in response to changes of engine load. The auxiliary pistons take up a substantial amount of space in the combustion chambers. This requires that the inlet and exhaust valves be smaller than would be desirable for optimum breathing capacity. Engines of these prior kinds require bulky additional components which substantially complicate the engine and which are very prone to rapid wearing.

Although Miller cycle internal combustion engines vary the compression ratio as a function of power output and do not suffer from the drawbacks described above, However, the mode of operation of prior Miller cycle engines requires the effective size of the combustion chamber to be relatively small, resulting in low power output per liter of piston displacement.

The fuel inlet valves and valve operating mechanism of prior Miller cycle engines are not designed to resolve other problems which also adversely affect fuel efficiency. For example, the operator controls the speed and power output of a conventional engine with a throttle valve which is situated in the flow path of the air and fuel. The engine must expend power in order to draw the mixture through the flow path constriction formed by the throttle valve. This throttling loss is a function of the product of the flow rate through the throttle valve and the pressure difference between the upstream and downstream side of the valve. Throttling loss is minimal when the engine operates at maximum power as the pressure difference across the fully open valve is minimal. The throttling loss is also minimal when the engine is operating at or near idling speed as the flow rate through the valve is minimal at that time. Throttle loss rises substantially and may consume as much as 30% of the engine power at the intermediate region of the engines output power range. As has been pointed out above, automobile engines operate within this intermediate power region much of the time. Elimination of the throttle and its attendant losses would substantially increase fuel efficiency of the engine.

A further factor is the increasing use of ethanol as an additive (or significant constituent) to the gasoline fuel. It has been observed that spontaneous detonation of the fuel charge in the combustion chamber, otherwise known as knocking, can result in power loss and even damage to the engine. Although ethanol additives are known to reduce spontaneous detonation, the alcohol has less energy density than gasoline, resulting in reduced power and fuel efficiency. It is very desirable to derive the maximum efficiency from this fuel mixture in order to realize the economy of ethanol-based fuels.

BRIEF SUMMARY OF THE INVENTION

The present invention comprises method and apparatus for providing three features aimed at improving fuel economy of four stroke internal combustion engines. The first of these features is the provision of a compression ratio which is higher than normal when the engine is operating at light load;

and which varies from very high at idling, down to normal at full power. This is effected by a movable piston in the combustion chamber connected to the throttle.

The second of these features is the provision of variable timing as well as a variable amount of opening of the inlet valve, such that at idle, the valve opens at top center of the main piston, opens only a fraction of its full lift, and closes about 70° crankshaft past top center. As the throttle is opened, the inlet valve opens farther at each open excursion to create as little flow resistance as possible to the inlet draw. The middle of its open excursion during each valve actuation moves in the same direction as the crankshaft enough that as the open duration becomes greater, the valve always begins to open as the main piston starts its inlet stroke, but closes later. Finally, at full power, the inlet valve begins to open slightly before the main piston comes to top center, opens fully, and closes somewhat after the main piston has reached bottom center and has started the compression stroke.

A third feature of the invention is the provision of a mechanism that separates the function of variable timing of the inlet valve from the variable compression ratio function, thereby providing greater control and efficiency.

DETAILED DESCRIPTION OF THE INVENTION

The present invention generally comprises an improvement for internal combustion engines. With regard to FIG. 1, a typical internal combustion reciprocating engine 12 has one or more cylinders 13 in which power pistons 17 reciprocate and which operate on a four stroke cycle in which the pistons repetitively undergo fuel inlet strokes, compression strokes, expansion strokes and exhaust strokes. Engines 12 of this type have one or more fuel inlet valves 14 and one or more exhaust valves 16 at the head end 18 of each cylinder 13. This initial example of the invention has a single inlet valve 14 and a single exhaust valve 16 at each cylinder 13.

Figure 1:
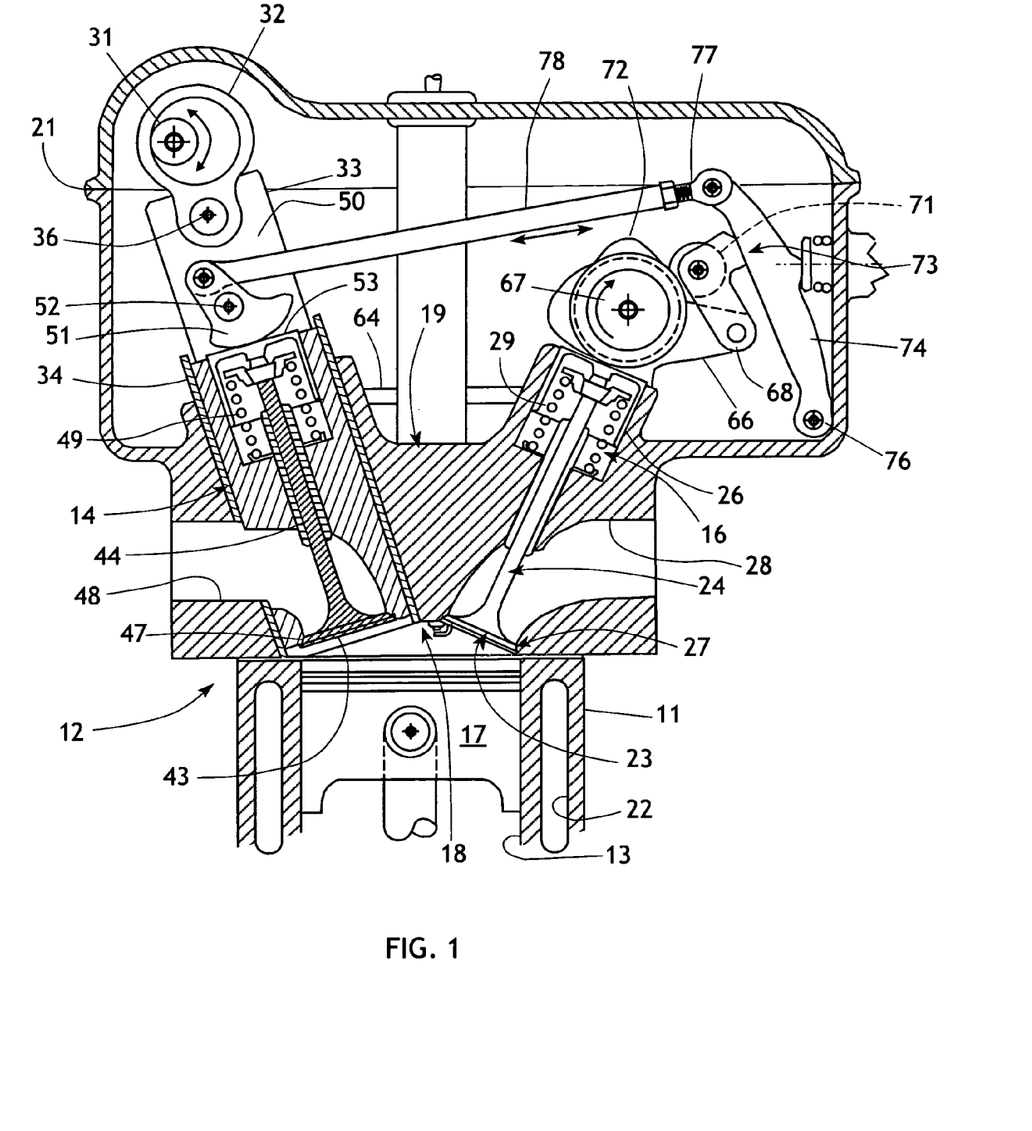
FIG. 1 is a cross-sectional elevation of a cylinder and cylinder head of an internal combustion engine, showing the variable compression and variable inlet valve timing mechanism of the present invention.

The inlet and exhaust valves 14 and 16 extend within a cylinder head member 19 which is secured to the engine block 11, a head gasket 21 being disposed between the head member and engine block. Head member 19 and engine block 11 have internal passages 22 through which fluid coolant is circulated in the known manner.

The exhaust valve 16 may be of the conventional poppet type having a circular head 23 from which a stem 24 extends upward into a recess 26 in cylinder head member 19. The circular head 23 seats in a conforming circular valve seat 27 at the underside of head member 19 at the end of an exhaust flow passage 28 in the head member. A compression spring 29 seated in recess 26 biases the exhaust valve 16 to the closed position of the valve. The valve actuator mechanism, which will be described in detail below, temporarily opens the exhaust valve 16 during exhaust strokes of the power piston 17.

Unlike a typical fuel inlet valve, which is typically a poppet valve type, the invention provides an inlet valve mechanism 14 that is designed to fulfill the objectives of the invention: to vary the compression ratio of the power cylinder in response to load demand, and to vary the timing as well as the open dwell of the inlet valve. With continued reference to FIG. 1, the inlet valve mechanism 14 includes a reciprocable piston 33 slidably received in a sleeve 34 that lines the valve bore in the cylinder head and provides a durable wearing surface. A power control shaft (throttle shaft) 31 is supported to extend along the cylinder head, and an eccentric 32 is mounted on the shaft 31 for each cylinder of the engine. The upper end of piston 33 is joined by pin 36 to the eccentric 32 so that the piston 33 is driven to translate in the sleeve 34 toward and away from the combustion chamber. Note that the throttle shaft may be the output of a direct mechanical connection to the driver's throttle control (e.g., accelerator pedal), but in modern vehicles the shaft 31 typically may be the output of a servo motor that is driven by throttle input sensors, pressure and temperature sensors, and the like.

As the inner end of the piston moves toward the combustion chamber in response to angular excursions of the power control shaft 31, the effective volume of the chamber is reduced and the compression ratio is increased accordingly.

In addition, the inlet valve includes a valve stem 44 which extends through a central opening in the piston 33, and a circular head 43 is supported at the inner end of the stem 44. The head 43 is dimensioned to seat in conforming circular valve seat 47 in the underside of head member 19 at the end of inlet flow passage 48 in the head member. A compression spring 49 is seated in piston 33 to bias the valve stem outwardly and maintain the valve head seated and closed.

The upper end of piston 33 is provided with a transverse slot 50 extending generally diametrically into the outer end thereof, in which the lower end of eccentric strap 32 is secured by pin 36. In addition, the inlet valve mechanism includes a rocker cam 51 joined in pivoting fashion to the piston 33 by axle 52. Rocker cam 51 impinges on the flat confronting surface 54 of cam follower 53, which impinges on the valve stem. Drive pin 56 is located on an eccentric lobe of rocker cam 51 to rock the cam back and forth on its engagement with the flat surface 54, under the direction of a mechanism described below. The rocker cam 51 has a unique profile which begins at the left edge (in FIGS. 1 and 9) with a portion 57 having a constant radius $R_1$, that provides zero lift (opening motion) to the valve stem. It transitions smoothly into an increasing radius portion 58 that provides increasing lift with rocker displacement through an angle of about 60°. At the opposed end of the portion 58 is a cam surface portion 59 having a constant radius $R_2$.

Figure 9:
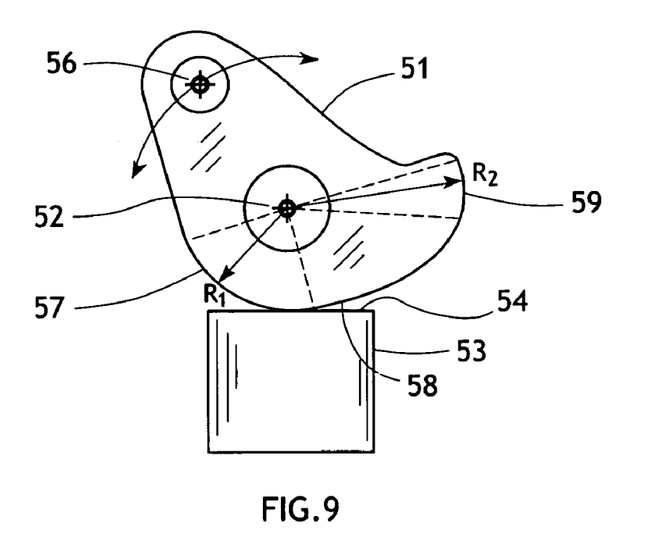
FIG. 9 is a plan elevation depicting the geometric features of the rocker cam of the invention.

The rocker cam 51 provides functionality that is not known to be achievable with a rotating cam. This is due in part to the conformation of the camming surface portions 57-59, and in part to the fact that the cam 51 is designed to rock back and forth rather than rotate, and the rocking action can be controlled as described below. Moreover, the reversal of direction that is inherent in the rocking motion may occur at differing valve timing positions, leading to a more flexible and controllable inlet valve action. The cam portion 57 provides no valve lift through a substantial arc, and transitions smoothly into portion 58, which provides increasing lift as the cam rotates clockwise. The cam surface 59 at the maximum lift end of portion 58 is also a constant radius, so that the valve may remain fully open even when the cam travels past the point of maximum lift.

Figure 2:
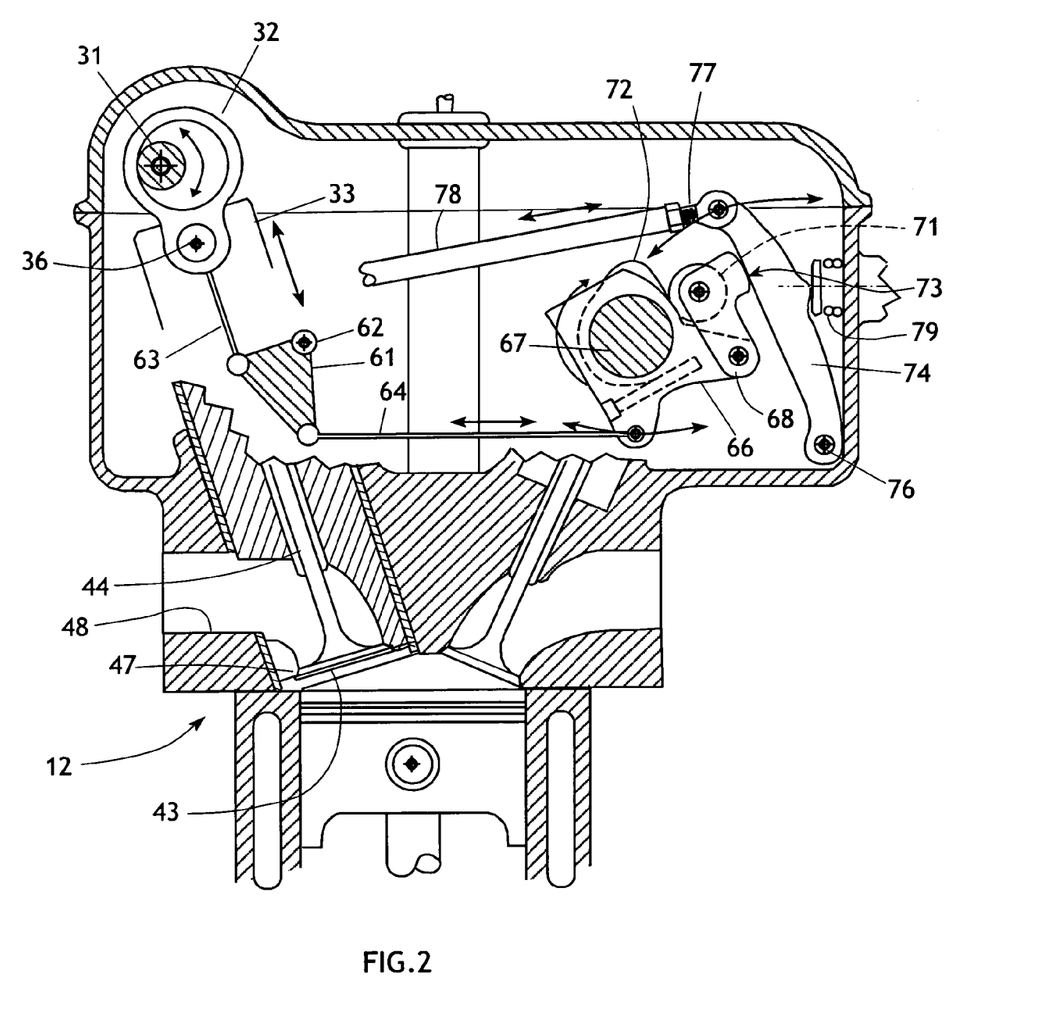
FIG. 2 is a cross-sectional elevation as in FIG. 1, showing additional portions of the variable compression and variable inlet valve timing mechanism.

With regard to FIG. 2, the inlet valve mechanism further includes a bell crank 61 that rotates about a fixed pivot 62. The triangular bell crank 61 is tied at one vertex to link 63 that is in turn connected to eccentric 32. Thus as eccentric 32 is rotated counterclockwise about shaft 31. link 63 pulls upward on bell crank 61 and rotates the bell crank clockwise about pivot 62. The third vertex of crank 61 is rotatably pinned to link 64 extending laterally to join a roller lever yoke 66, that is rotatably secured on spinning camshaft 67. Consequently, as link 64 is pulled leftward by the crank 61, the roller lever yoke 66 is rotated clockwise about camshaft 67. Roller lever 68 is pivotably pinned on its yoke 66, and supports a cam following roller 71 that is engaged by a single lobe cam 72 mounted on camshaft 67. Roller lever 68 includes a cam surface 73 disposed to impinge on lever 74 that is pivotally secured by axle 76. The free end of lever 74 is secured by an adjustable threaded connection 77 to link 78, which in turn is pivotally pinned at its opposite end to the pin 56 of the lobe of rocker cam 51 (see also FIGS. 1 and 9). Spring 79 bears continuously on lever 74 to keep the roller in lever 68 against the cam 72 and prevents play from developing in the system.

Figure 8:
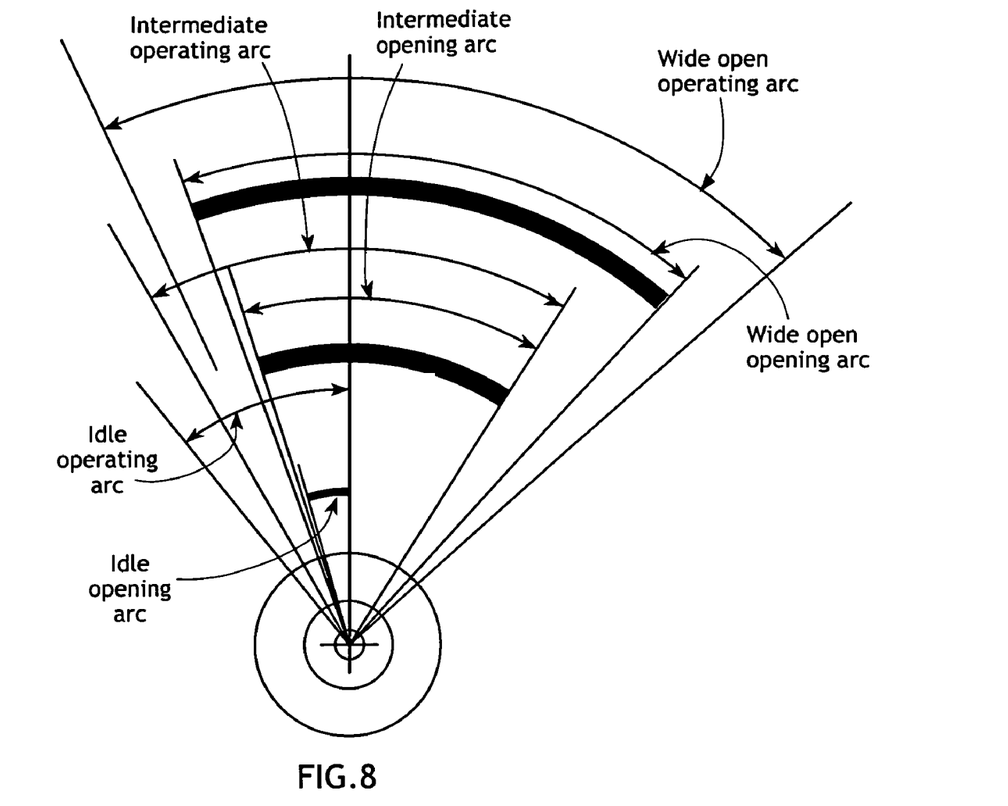
FIG. 8 is a graphic depiction of the variable inlet valve operation and a comparison operating arc and opening arc for different engine load conditions.

As noted above, link 64 is pulled leftward by bell crank 61 when the throttle shaft 31 is rotated counterclockwise, and roller lever yoke 66 is rotated clockwise about camshaft 67 (in the same direction as the rotation of camshaft 67). This causes roller lever 68 to be drawn clockwise about the center of camshaft 67, in the direction of decreasing phase angle, and cam surface 73 to move closer to fixed pivot 76 along the surface of lever 74. Thus, as cam lobe 72 engages the roller and pushes cam surface 73 rightward, lever 74 moves further, pulling further on link 78 and causing rocker cam 51 to turn further on axle 52 in a clockwise direction, pushing down further on cam follower 53 and opening the inlet valve further. Thus the inlet valve is opened slightly earlier and is closed significantly later (than it would be in a position of lower power output). This means that the opening time of the inlet valve retards (occurs later in time). With reference to FIG. 8, the net effect on the valve timing is depicted graphically. Note that the inlet valve actuation is shown for idle, intermediate, and wide open (full throttle) engine operation. Also, the opening arc and operating arc for each engine setting are depicted. The difference in opening and operating arcs is found in the "overtravel" of the rocker cam 51; that is, the rocker cam always starts within the closed, zero lift zone 57, and can travel a variable distance to the lift portion 58 and then reverse, or travel all the way to the fully lifted portion 59 before reversal. The overtravel may occur in the zero lift areas 57 and 59 when the valve is fully open or fully closed. The opening arc is thus always narrower than the operating arc, due to the dwell time on the zero lift portions Thus, with reference to FIG. 8, the idle opening arc (as the rocker cam moves from portion 57 to 58) is much narrower than the idle operating arc, which includes all of the zero lift portion 57 as well. Both are relatively narrow compared to the other engine settings. Likewise, the intermediate operating arc begins in a slightly retarded timing, and is much wider that the idle operating arc, due to the fact that the rocker cam moves much farther onto the lifting surface 58 during intermediate engine speed. Similarly, the wide open operating arc is even more retarded in time, and extends through a much wider angle. The threaded connection 77 enables adjustment to obtain optimum valve motion at the time of assembly. The working surface of lever 74 may be contoured to obtain optimum combinations of valve timing and open duration throughout the power range.

To summarize the operation of the invention, As the throttle is opened by moving eccentric 32 counterclockwise, three things occur together:

1) Piston 33 rises, increasing the volume of the combustion chamber, thereby lowering the compression ratio;

2) The inlet valve opens further according to the action of rocker cam 51 operated by the mechanism described with particular reference to FIG. 2;

3) The inlet valve opens slightly earlier and closes substantially later, relative to other events in the engine, so that the period of an open duration retards.

Note that the exhaust valve is driven by the camshaft 67 in any manner known in the prior art, and that operation is not affected by the presence and operation of the present invention.

It may be appreciated that in the mechanism of FIGS. 1 and 2 the variation in compression ratio is linked (literally and figuratively) with the variation of inlet valve timing, through the use of the bell crank 61 connected to the eccentric 32 that also operates the piston 33. With regard to FIG. 3, a further embodiment of the invention is designed to achieve the same results as the previous embodiment, while also providing independent control of the compression ratio variation and the inlet valve timing and dwell. In doing so it also eliminates the closing bias spring 49 of the inlet valve mechanism. The advantage of this configuration is not only that the timing and magnitude of the variation in compression ratio is independent of the timing of the inlet valve opening and duration, but also that the friction between rocker cam 51 and follower 53 as well as the friction between follower 63 in its bore in piston 33 is very much reduced, requiring less work to be done by cam 72.

Figure 3:
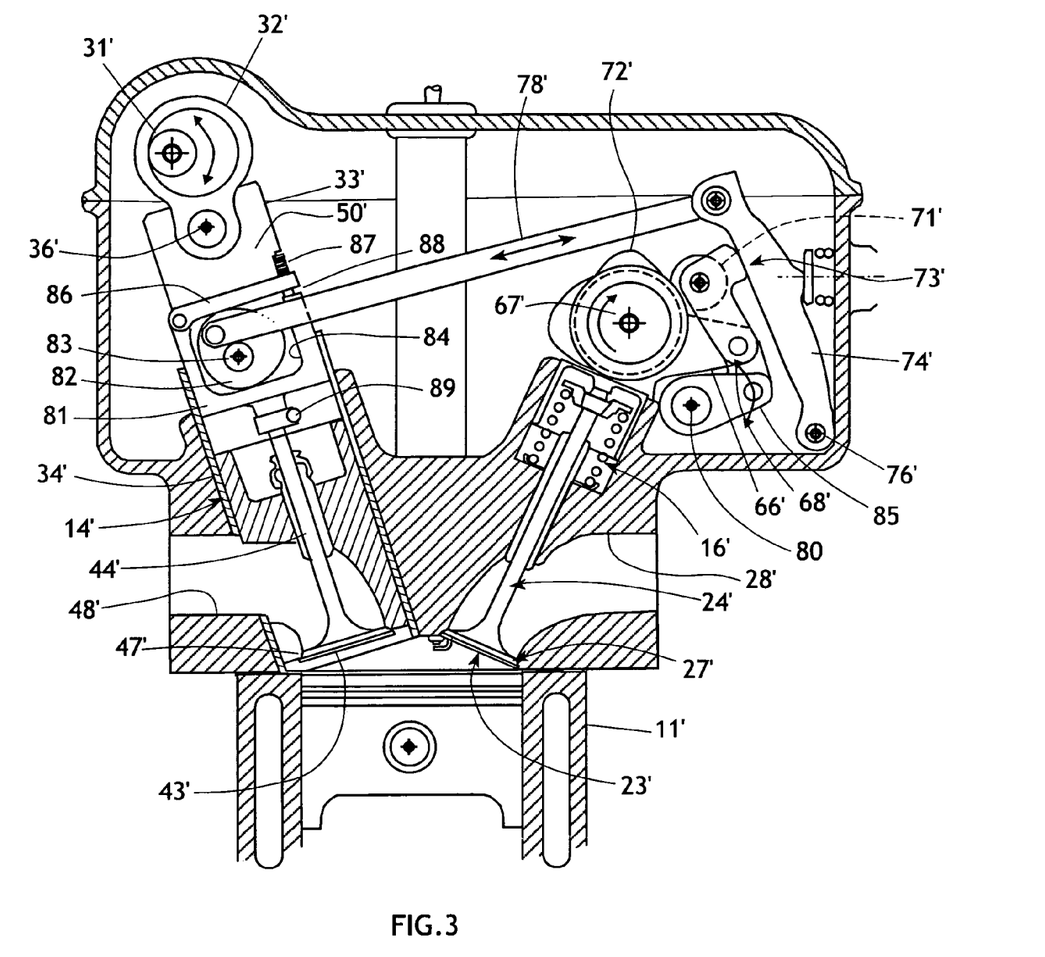
FIG. 3 is a cross-sectional elevation of a cylinder and cylinder head of an internal combustion engine, showing another embodiment of the variable compression and variable inlet valve timing mechanism of the present invention.

The embodiment of FIG. 3 employs many of the components described in the previous embodiment, which are labeled with corresponding reference numerals having a prime (') suffix. In this embodiment the throttle shaft 31' is actuated by a servomotor that is driven by a computer. The computer calculates a desired compression ratio based on inputs such as pressure, temperature, engine speed, load, accelerator position, and the like, and rotates the shaft 31' accordingly. In addition, the inlet valve timing and lift control mechanism is driven by another servomotor that is driven by a different computer signal, based on a calculation of optimum inlet valve timing and duration. The second servomotor is connected to rotate shaft 80, which supports an eccentric 85 that is linked to roller lever yoke 66'. As a result, rotation of the shaft 80 rotates the roller lever yoke 66' in the same manner as did bell crank 61 in the previous embodiment, except that the servomotor actuation of shaft 80 is independent of the servomotor actuation of shaft 31'.

Furthermore, the previous rocker cam and its cam follower and the spring 49 are eliminated. The inner end of inlet valve stem 44' is secured to box-type cam follower 81 that is operatively engaged with a cam 82 that is secured to piston 33' by axle 83. Cam follower 81 includes a coffer-like recess 84 that opens upwardly and receives the cam 82 therein, and a cam seat 86 is pivotally connected to the left vertical side of cam follower 81 and disposed to span the opening of the coffer recess 84. A cap screw 95 extends through the free end of cam seat 86 to the right side of the cam follower 81 and secures a helical spring 96 that bears on the seat 86. Link 78' is fashioned as a pair of parallel rods that are connected to lever 74' at one end by an eccentric bushing 90 that enables length adjustment of the distance between the lever 74' and the cam 82. At the other end the links 78' join eccentrically to opposite sides of the cam 82 and cam follower 81 to maintain the cam and follower aligned in the recess 33' in which they are located. It may be appreciated that as the cam 82 reciprocates within the follower 81, it drives the follower 81 to reciprocate up and down in a direction coaxial with the valve stem 44', opening and closing the inlet valve in response to the mechanism described above with reference to the previous embodiment. The spring 96 pushing down on the seat 86 maintains constant contact with the cam 82 and creates a constant force urging the valve stem upwardly to the closed valve position.

Figure 4:
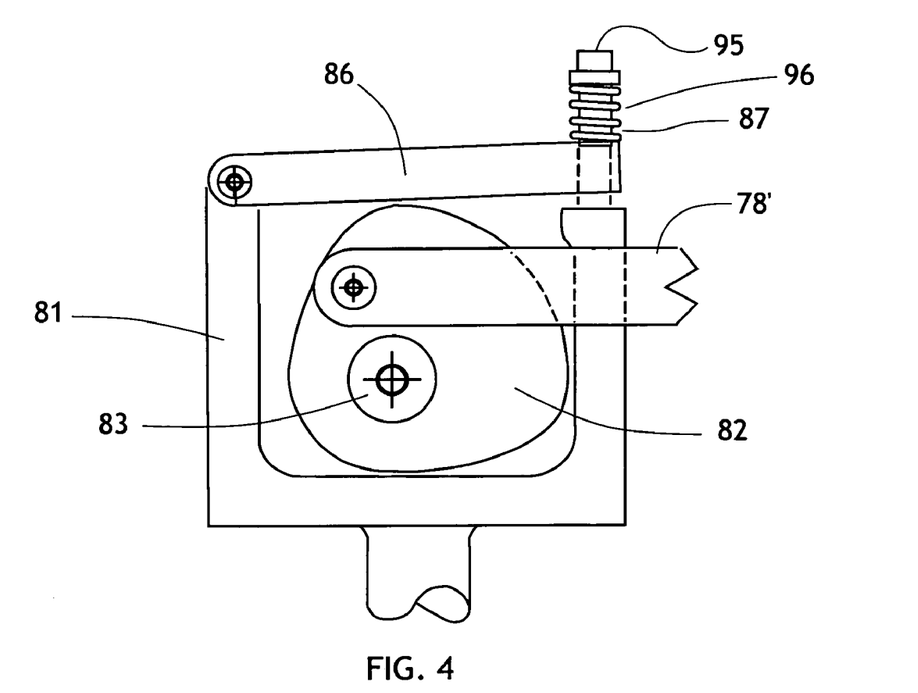
FIGS. 4 and 5 are both side elevations of the cam and cam follower of the embodiment of FIG. 3, showing the extreme positions of the cam.
Figure 5:
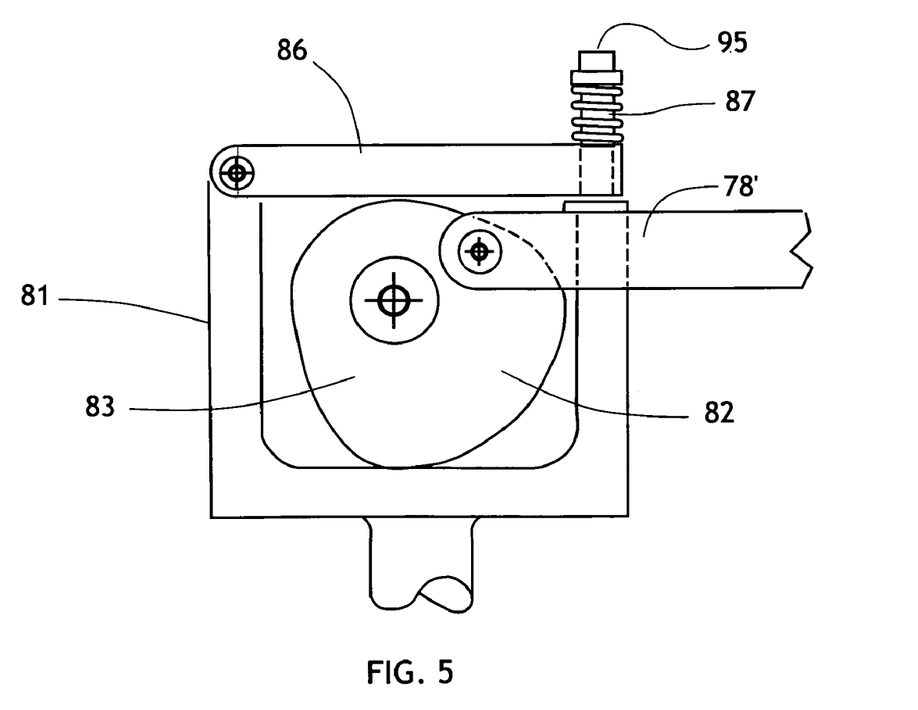

With regard to FIG. 4, the cam 82 is shown rotated counterclockwise about axle 83 to the point of maximum upper travel of the follower 81, which necessarily drives the valve stem upwardly to the same extent to close the inlet valve. The follower 81 rests on cylindrical portions of the cam 82 and thus is held still, even if the cam should overtravel by some small amount. In FIG. 5, the links 78' have pulled the cam 82 approximately 80° clockwise. The follower, which has been driven downwardly to the maximum extent, again rests on cylindrical portions of the cam. Thus FIGS. 4 and 5 depict the limits of travel of the follower 81. (Note that the 80° excursion is not mandatory, but may be set empirically or by design to suit an engine layout.)

Figure 6:
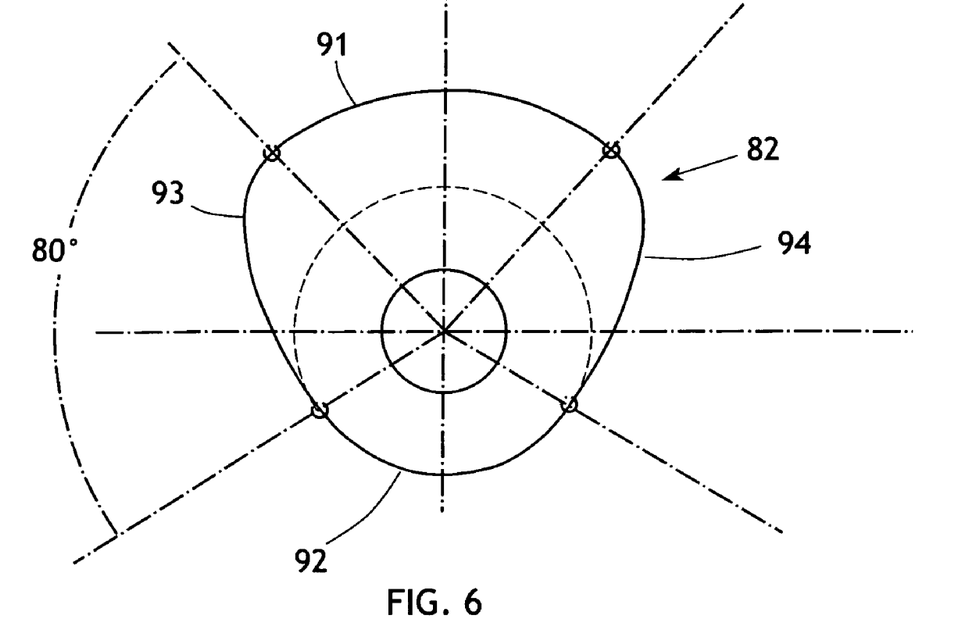
FIG. 6 is a plan view showing the shape of the constant diameter cam, symmetrical about a vertical centerline.

The requirements for the shape of cam 82 are simple, and achievable using simple design rules. As shown in FIG. 6, the cam has a unique symmetrical profile wherein there is a large radius cylindrical portion 91 and a small radius cylindrical portion 92. The difference in these two radii is the amount of motion the cam will impart to the box follower (similar to the rocker cam of the previous embodiment). The curved flanks 93 and 94 that connect the large and small radii together area a mirror image of each other about the vertical centerline. Each flank is like one flank of an ordinary valve actuating cam. It has a gentle accelerating portion blending into a maximum velocity part at midpoint, then blending into a gentle deceleration portion, which again joins a cylindrical portion. In all cases the angular separation between the end of one cylindrical portion and the beginning of the next cylindrical portion is approximately 80°. In this way the cam remains in contact with bother upper and lower flat surfaces of the box follower at all times.

The exact cam flank curvature is not critical as it has only three criteria to meet:

a) The profile of the rise to its midpoint, where the follower is accelerated to its maximum velocity, must be equal to but opposite in sense from the second half of the rise, which decelerates the follower and brings the follower's velocity from maximum to zero.

b) The profile of the follower return flank on the opposite side of the cam must be a mirror image of the follower lift flank on the first side.

c) The identical but opposite rise and fall flanks are angled apart from each other to the point where the cam's diameter is constant.

In this way the cam remains in contact with both upper and lower flat surfaces of the box follower at all times.

Figure 7:
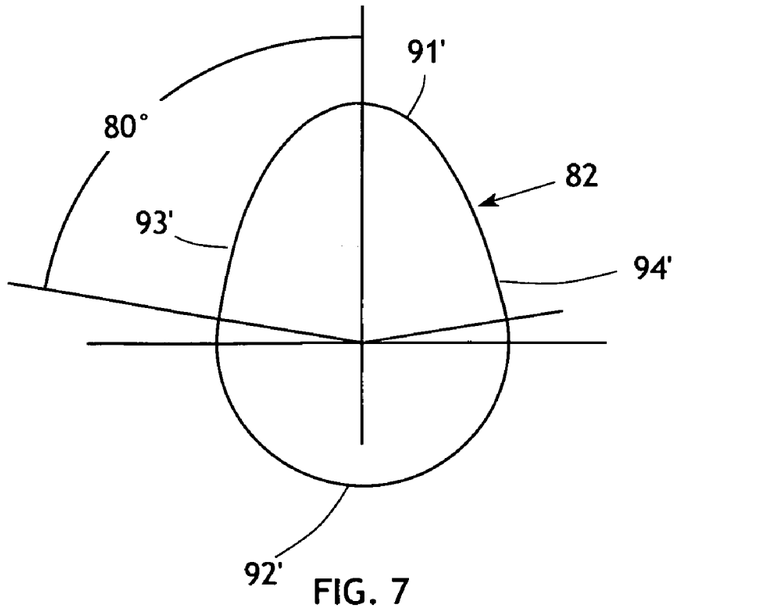
FIG. 7 is plan view showing the same 80° lift portion as in FIG. 6, but as it would appear on a conventional cam.

FIG. 7 depicts another possible shape design for cam 82, showing how the same flanks 93 and 94 would appear on a conventionally configured, single lobe cam, for purposes of illustration only.

Returning to FIG. 3, the threaded end of valve stem 44' screws into the bottom of cam follower 81. Spring 87 surrounds stop screw 95 which is screwed into the right vertical leg of follower 81. For reasons familiar to those in engine design, valve 43' must remain firmly against valve seat 47' at all times that cam 82 is not pushing it open. To ensure this condition, at the time of assembly cam 82 is turned so that its small radius cylindrical portion or heel is resting in the bottom of follower 81. Then valve stem 44' is screwed into follower 81 to the point where a gap 88 opens up to a clearance of approx. 0.012". Then thread clamp locking screw 89 is accessed through a hole in the side of piston 33' and tightened, locking the assembly in the preferred arrangement.

The operation of most portions of the embodiment of FIG. 3 is the same as described with reference to FIGS. 1 and 2. That is, the roller lever yoke 68' and roller 71' are driven by the cam 72', and lever 74' and links 78' transfer reciprocal motion to reciprocate the cam 82. However, the servo shaft 80 rotates to rotate the roller lever yoke about the camshaft 67' to modify the inlet valve timing as described previously. A major difference is that the cam follower 81 drives the inlet valve to open and close due to the rotation of cam 82, obviating the inlet valve spring 49 and the rocker cam 51. And, the operation of piston 33' to alter the compression ratio of the power cylinder is entirely separate from the operation of roller lever yoke 68' and its control of the inlet valve timing and duration of opening.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In an internal combustion engine having at least one power piston that reciprocates within an engine cylinder to define a combustion chamber and which is coupled to an engine crankshaft and having a camshaft which is turned by the crankshaft and having an throttle control which is movable to vary the power output of the engine and a fuel inlet valve having a sleeve and a valve piston which is movable along a path of travel which extends axially within said sleeve to the combustion chamber, the improvement comprising:

first means for increasing the volume and thereby reduce the compression ratio of the combustion chamber when the throttle control is moved to increase the power output of the engine;

second means for increasing the opening of the inlet valve when the throttle control is moved to increase the power output of the engine;

third means for opening the inlet valve earlier and closing the inlet valve later during each inlet stroke of the power piston when the throttle control is moved to increase the power output of the engine;

wherein said first means includes first linkage means connecting said throttle control and said valve piston to move said valve piston away from said combustion chamber as said throttle control is moved to increase the power output of the engine;

wherein said throttle control includes a rotatable throttle shaft, and said first linkage means includes an eccentric component secured to said throttle shaft and connected to said valve piston.

2. In an internal combustion engine having at least one power piston that reciprocates within an engine cylinder to define a combustion chamber and which is coupled to an engine crankshaft and having a camshaft which is turned by the crankshaft and having a throttle control which is movable to vary the power output of the engine and a fuel inlet valve having a poppet valve which is movable along a path of travel which extends axially to the combustion chamber, the improvement comprising:

first means for increasing the opening of the inlet valve when the throttle control is moved to increase the power output of the engine;

second means for opening the inlet valve earlier and closing the inlet valve later during each inlet stroke of the power piston when the throttle control is moved to increase the power output of the engine;

wherein said first means includes a reciprocating rocker cam disposed to reciprocate said poppet valve along said path of travel, and a roller yoke mechanism mounted on said camshaft and connected by a rigid link to operate said rocker cam.

3. The improved internal combustion engine of claim 2, wherein said second means includes a bell crank mounted for pivoting movement, means for linking one portion of said bell crank to an eccentric component on said throttle control, and means for linking another portion of said bell crank to said roller yoke mechanism, whereby movement of said throttle control to increase engine power pulls said bell crank to rotate and pull said roller yoke mechanism to rotate partially about said camshaft, and said roller yoke mechanism is rotated in the direction of retarding the timing of the operation of said poppet valve.

4. In an internal combustion engine having at least one power piston that reciprocates within an engine cylinder to define a combustion chamber and which is coupled to an engine crankshaft and having a camshaft which is turned by the crankshaft and having an throttle control which is movable to vary the power output of the engine and a fuel inlet valve having a sleeve and a valve piston which is movable along a path of travel which extends axially within said sleeve to the combustion chamber, the improvement comprising:

first means for increasing the volume and thereby reduce the compression ratio of the combustion chamber when the throttle control is moved to increase the power output of the engine;

second means for increasing the opening of the inlet valve when the throttle control is moved to increase the power output of the engine;

third means for opening the inlet valve earlier and closing the inlet valve later during each inlet stroke of the power piston when the throttle control is moved to increase the power output of the engine;

wherein said inlet valve includes a valve member having a head end seated at the inner end of said valve piston and a valve stem extending slidably and coaxially through said valve piston, said second means including a valve cam mounted on said valve piston and a valve cam follower joined to the outer end of said valve stem to drive said valve member reciprocally to open and allow it to close.

5. The improved internal combustion engine of claim 4, wherein said valve cam mounted on said valve piston comprises a rocker cam.

6. The improved internal combustion engine of claim 4, further including a roller lever yoke mounted on said camshaft in freely rotating fashion, a roller lever pivotally supported on said roller lever yoke, and a earn following roller supported on said roller lever and disposed to engage a single lobe cam secured to said camshaft, whereby said roller lever is driven by said single lobe cam to pivot reciprocally on its mount on said roller lever yoke.

7. The improved internal combustion engine of claim 6, further including a drive lever pivotally mounted at one end adjacent to said roller lever yoke, said roller lever including a cam surface disposed to impinge on said drive lever and move said drive lever reciprocally in concert with reciprocal motion of said roller lever.

8. The improved internal combustion engine of claim 7, wherein said drive lever includes a free end, and further including a link extending from said free end of said drive lever to said valve cam, whereby reciprocal motion of said drive lever is transferred to said valve cam to reciprocate said valve member.

9. The improved internal combustion engine of claim 8, wherein said valve cam comprises a rocker cam.

10. The improved internal combustion engine of claim 8, wherein said valve cam follower includes a generally rectangular opening to receive said valve cam, and said valve cam follower is arranged to drive said valve member both to advance toward said combustion chamber and open, and to retract said valve member and close.

11. The improved internal combustion engine of claim 10, wherein said inlet valve is free of any return spring.

12. The improved internal combustion engine of claim 10, wherein said valve cam includes an outer peripheral camming surface having a first portion with a first constant radius and a second portion with a second constant radius, said first and second portions being arranged symmetrically.

13. The improved internal combustion engine of claim 12, further including a cam seat member extending to span said rectangular opening and capture said valve cam within said rectangular opening, said cam seat member being rotatably pinned at one end thereof to said valve piston.

14. The improved internal combustion engine of claim 13, further including a spring secured to said cam follower and disposed to impinge on the other end of cam seat member to impinge said cam seat member on said cam and urge said valve to the closed position.

15. The improved internal combustion engine of claim 8, wherein said third means includes a bell crank pivotally secured adjacent to said inlet valve, means for linking one portion of said bell crank to said eccentric component on said throttle shaft, and means for linking another portion of said bell crank to said roller lever yoke, whereby movement of said throttle shaft to increase engine power pulls said bell crank to rotate and pull said roller lever yoke to rotate partially about said camshaft, whereby said roller lever yoke is rotated in the direction of retarding the timing of the engagement of the cam roller follower and said single lobe cam.

16. The improved internal combustion engine of claim 15, wherein said rotation of said roller lever yoke by said bell crank further causes said cam surface of said roller lever to move toward said pivotal mounting of said drive lever, whereby said reciprocal motion of said drive lever is increased in amplitude to drive said valve cam with greater amplitude and cause said inlet valve to open to a greater extent for a longer time period.

17. The improved internal combustion engine of claim 8, wherein said third means includes a servomotor shaft disposed adjacent to said roller lever yoke, and an eccentric mounted on said servomotor shaft and linked to said roller lever yoke so that rotation of said servomotor shaft causes said roller lever yoke to rotate partially about said camshaft, whereby said roller lever yoke is rotated in the direction of retarding the timing of the engagement of the cam roller follower and said single lobe cam.

* * * * *